United States Patent [19]
Harman

[11] 3,878,819
[45] Apr. 22, 1975

[54] MILKING MACHINERY CONTROL APPARATUS

[76] Inventor: Leonard Albert Harman, 30 Berwick St., Sydney, New South Wales-2161, Australia

[22] Filed: Oct. 31, 1973

[21] Appl. No.: 411,567

[30] Foreign Application Priority Data
Nov. 9, 1972  Australia............ 1155/72

[52] U.S. Cl.................... 119/14.08; 119/14.14
[51] Int. Cl. ............................................ A01j 7/00
[58] Field of Search............ 119/14.08, 14.14, 14.15

[56] References Cited
UNITED STATES PATENTS

| | | |
|---|---|---|
| 3,115,116 | 12/1963 | Schilling et al. ............. 119/14.08 |
| 3,556,053 | 1/1971 | Padman et al. ............. 119/14.08 |
| 3,690,300 | 9/1972 | Tonelli............................. 119/14.08 |
| 3,773,016 | 11/1973 | Needham et al................ 119/14.08 |

Primary Examiner—Hugh R. Chamblee
Attorney, Agent, or Firm—Browne, Beveridge, DeGrandi & Kline

[57] ABSTRACT

A milking machinery control apparatus for monitoring discrete pulses of milk, means producing a signal having electrical pulses corresponding to the pulses and means to discontinue milking.

15 Claims, 7 Drawing Figures

PATENTED APR 22 1975　　　　　　　　　　　　　3,878,819
FIG.1.
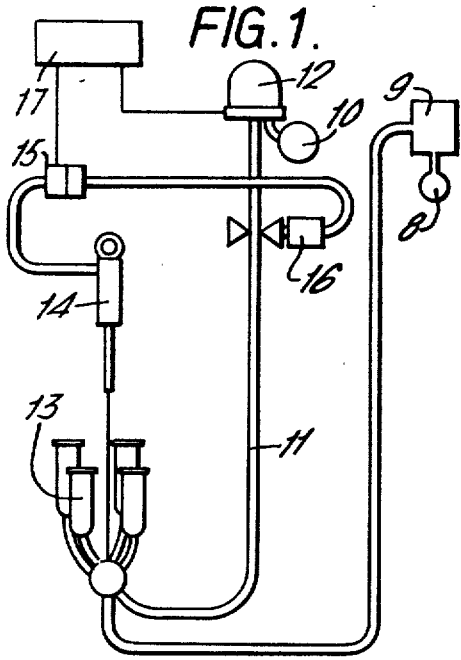
FIG.2.
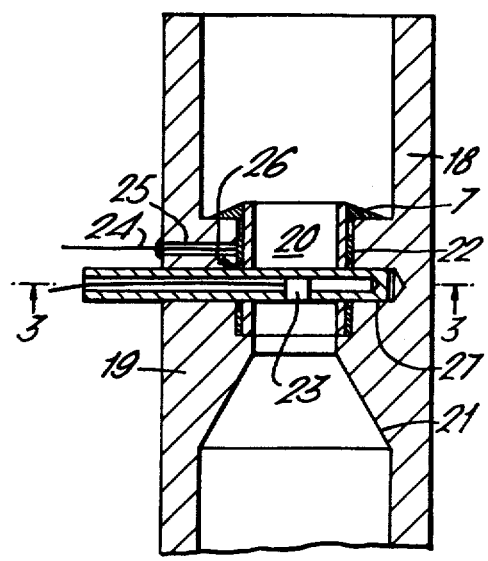
FIG.3.
FIG.4.
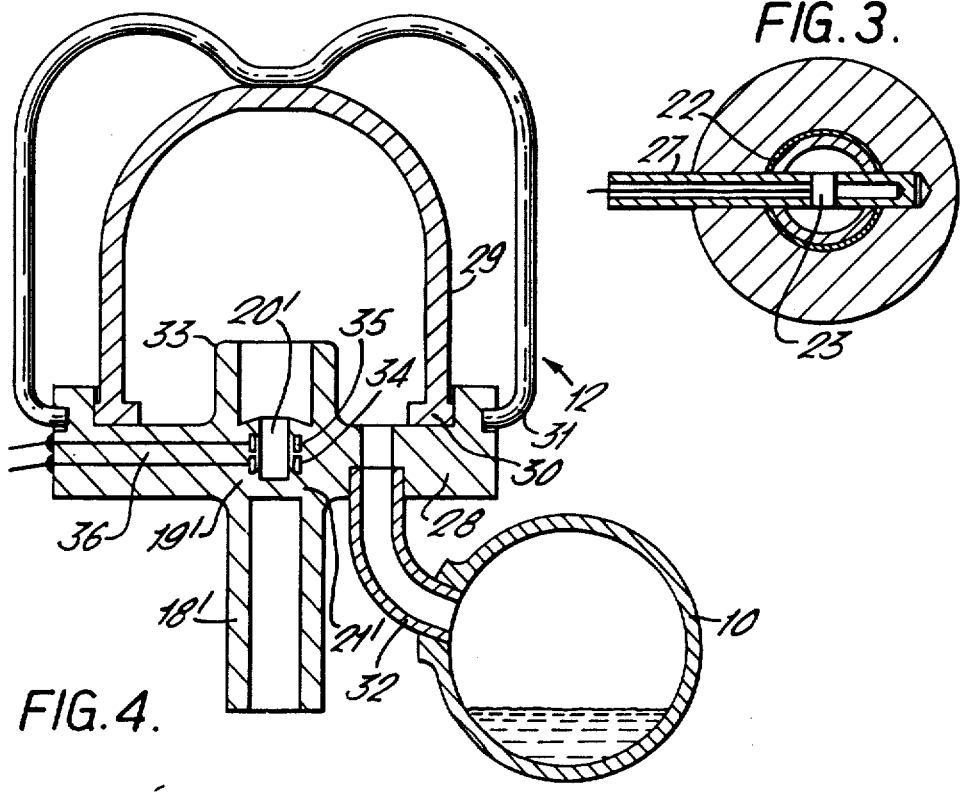

MILKING MACHINERY CONTROL APPARATUS

This invention relates to milking machinery, and in particular to the control of such machinery in response to the performance of each individual cow to achieve the most efficient management of the cows of a herd, and to ensure that health standards relating to the extent of milking of a cow are met automatically without prejudicing the efficiency of the milking process.

It is important that the milking of any cow should not proceed to the point at which the udder is completely exhausted of milk, and in view of this health authorities prescribe standards as to the point at which milking should be stopped. The present standard in Australia requires that milking should cease when the rate of flow of milk from the cow falls to ½lb/minute.

The flow of milk from the cow must of necessity be in the form of pulses, and this presents obvious difficulties in the measurement of the point at which milking should be stopped. Present techniques used for the accurate measurement of milk flow rate requires a volume integrator, consisting of a container of known volume with an outlet of known dimension. Milk from the cow is run into this container during milking, and the prescribed minimum flow rate is indicated when the level of milk in this container falls below a pre-set level. Such devices are not suitable for continuous operation, as they are difficult to wash without their removal from the remainder of the machinery. Such devices are furthermore limited to their usefulness to the indication of the critical flow rate only, and cannot also be used, for example, to determine total milk volume obtained from a particular cow. The object of the present invention is to provide apparatus for the control of milking machinery which is capable of monitoring the rate of milk flow from an individual cow and ending the milking of the cow upon the flow falling to a pre-set level, and which is furthermore capable of providing data relating to individual cows, particularly the total volume of milk obtained at each milking.

The present invention broadly resides in milking machinery control apparatus comprising means for monitoring plusating milk flow a cow, means producing an electrical pulse signal corresponding to said pulsating milk flow, aand means operating to discontinue milking upon the elapse of a predetermined time interval between successive pulses of said signal.

The invention will now be described, by way of example only, with reference to the accompanying drawings, in which:

FIG. 1 shows a general schematic view of milking apparatus at one bail, incorporating the present invention;

FIG. 2 shows in longitudinal section a capacitor probe construction according to a preferred form of the present invention;

FIG. 3 shows a cross-section taken on the line 3—3 of FIG. 2;

FIG. 4 shows an alternative preferred form of probe:

FIG. 5 shows circuitry associated with the capacitance probe in accordance with a preferred form of the invention;

FIG. 6 shows further control circuitry in accordance with a preferred form of the invention.

Figure 7:
FIG. 7 shows waveforms associated with the circuits of FIGS. 5 and 6.
Figure 7:
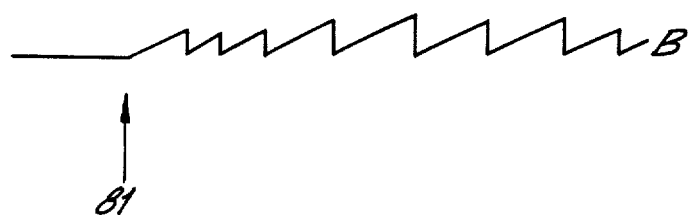
Figure 7:
Figure 7:

FIG. 1 shows conventional components of the milking apparatus consisting of a milk line 10 in which the milking vacuum is continuously present and which carries milk to a common milk storage container, a milk drop line 11 connected to the milk line through a sight glass 12 which allows, as is well known, visual inspection of the progress of the milking of the cow in the bail, and a set of teat cups 13. As is also well known, the teat cups are connected to a vacuum line 8 by way of a pulsator 9 which periodically relieves the vacuum applied to the teat cups, to provide the necessary pulsating action of the milking machine.

A lift-off cylinder operated by vacuum or air pressure and known per se is provided, controlled by a solenoid valve 15 and operable to lift the teat cups 13 at the cessation of milking. The valve 15 also controls a shut-off valve 16 to remove the vacuum from the teat cups at the end of a milking operation. There is further provided in the apparatus shown in FIG. 1, pursuant to the present invention, control apparatus 17 connected both to the solenoid valve 15, and via connection 18, to a probe (not shown in FIG. 1) located in the drop line 11 or in the base of the sight glass assembly 12. The control apparatus functions, as will be described in detail below, to sense, by means of the probe, the point at which milking should be terminated, and to terminate milking by operating the solenoid valve 15.

FIGS. 2 and 3 show one possible form of capacitance probe suitable for use in connection with the present invention. The probe shown therein comprises a plastics, ceramic or glass tube 18 of a diameter which enables it to be readily inserted into a break in the dropper line 11, closely the sight glass 12. This tube is moulded to provide a venturi region 19 with a constricted throat 20 through which a surge of milk must pass from the lower end of the tube and the tampered portion 21. The purpose of the venturi 19 is to concentrate each upwardly surging pulse so that the region 20 will be substantially completely filled with milk for the duration of a surge or pulse, thereby producing the maximum differentiation between a genuine milk pulse, and, for example, run-back of milk which has failed to enter the sight glass.

The problem of this run-back is a considerable one, and the second important function of the venturi is to so increase the velocity of the pulse that it shoots into the sight glass (and thence to the milk line 10) with sufficient velocity that very little is able to flow back the tube 18.

We have found that run-back can be further reduced by the provision of a frusto-conical surface 7 surrounding the upper end of the venturi throat 20. With each milk pulse a small quantity of milk runs back down the walls of the tube 18 and is collected in the reservoir defined by the conical wall 7. With the succeeding pulse, this collected milk is re-entrained so that the reservoir is emptied in readiness for the next run-back, so that little or no milk runs back down the throat 20 from the walls of the tube 18.

An upstanding annular flange surrounding the upper end of the venturi throat 20 may also be employed in the place of the frusto-conical surface 7.

Embedded within the tube 18 in the venturi throat region 20 are a pair of capacitance electrodes 22, 23. The electrode 22 consists of a copper ring embedded beneath a layer of adhesive or epoxy resin, closely adjacent the surface of the throat 20. If desired, the electrodes may be moulded within the tube 18. This electrode 22 is connected to the external circuit my means of a wire 24 which is introduced through a drilled passage 25.

The electrode 22 is provided with a pair of diametrically opposite apertures 26 to accommodate a tube 27 of suitable dielectric material such as plastics, ceramic or glass which is embedded in the tube 18 so as to intersect the throat 20 along a diameter thereof. This tube 27 carries the second electrode 23, which takes the form of a small piece of copper mounted within the tube and exposed to the milk through a side thereof, the electrode 23 being located on the longitudinal axis of the passage 20.

Thus the electrodes 22 and 23 form a capacitor, the capacitance of which depends in part on the dielectric constant of the medium within the passage 20. We have found that the dielectric constant of milk differs sufficiently from that of air that accurate and reliable measurement of the passage and waveform of milk pulses through the tube 18 can be made by monitoring the variations in the capacitance between the electrodes 22 and 23.

Control apparatus employing the capitance variation thus obtained will be described below, but before turning to a consideration of that apparatus, an alternative probe construction will be described with reference to FIG. 4. In this drawing where parts corresponding to parts of the probe assembly are given corresponding reference numerals distinguished by a single inverted comma, the tube 18' if formed integrally with the base 28 of the sight glass assembly 12.

The sight glass assembly is of a type otherwise known per se, comprising a glass 29 mounted on the base 28 with a gasket 30, and held in place by a clip 31. Milk rising in the drop pipe enters the tube 18' and passes with increased velocity through the constricted venturi throat 20' to emerge as a jet in into the chamber defined by the sight glass 30, from which it runs via the tube 32 to the milk line 10. A tubular extension 33 surrounds the exit from the orifice of the throat 20' to reduce the quantity of milk finding its way back down the tube again.

Embedded in the wall surrounding the venturi passage 20' in a manner similar to that shown in FIGS. 2 and 3, are a pair of capacitor electrodes 34, 35 each consisting of copper or other metal rings, co-axial with the passage 20', but axially separated such that, as in the case of the previously described embodiment, significant change of capacitance occurs with the passage of a pulse of milk through the venturi throat 20' and into the sight glass assembly 12. The electrodes 34 and 35 are connected to the external circuit by means of embedded wires 36. It will be noted that in this use neither electrode contacts the milk. This eliminates any problem of corrosion, which may otherwise occur.

The embodiment shown in FIG. 4, offers an important advantage over that of FIGS. 2 and 3, in that the probe electrodes and venturi 20' are, in the former, as close as is practicable to the chamber of the sight glass assembly 12. This is of significance in reducing fallback of the rising milk. While the use of a venturi passage for the location of the probe electrodes and, in the case of an electrode configuration as shown in FIGS. 2 and 3, the use of an electrode mounted on the venturi axis, minimizes the likelihood of spurious pulses being recorded by the control circuitry as milk flows back down the tube 18 and 18', yet it remains possible under favourable conditions for a plug of milk to oscillate up and down the tube 18 or 18', continually actuating the capacitance probe but without entering the sight glass chamber. By placing the venturi and electrodes within the sight glass base 28, this effect is eliminated.

It will be noted that the need for these precautions against spurious probe outputs due to oscillation of a milk plug arises from the vertical upward orientation of the tube 18 or 18', and it may be thought that this would be solved by the use of a downwardly arranged feed to the milk line through the probe. Such as arrangement is, however, not to be recommended as it is then no longer possible to ensure that the probe detects only single well-formed pulses of milk, and a large proportion of the total milk flow through the probe can occur as non-impulsive flow along the walls of the venturi throat 20 or 20', so that the usefulness of the control apparatus to be described below, in being readily adaptable to give a reading for the total milk taken from each cow by the machine, is destroyed. For this reason, even in milking machines where the milk line 10 is below the level of the teat cups, the probe is located below the milk line so that upward movement of milk through the probe is still achieved.

Figures 5, 6:
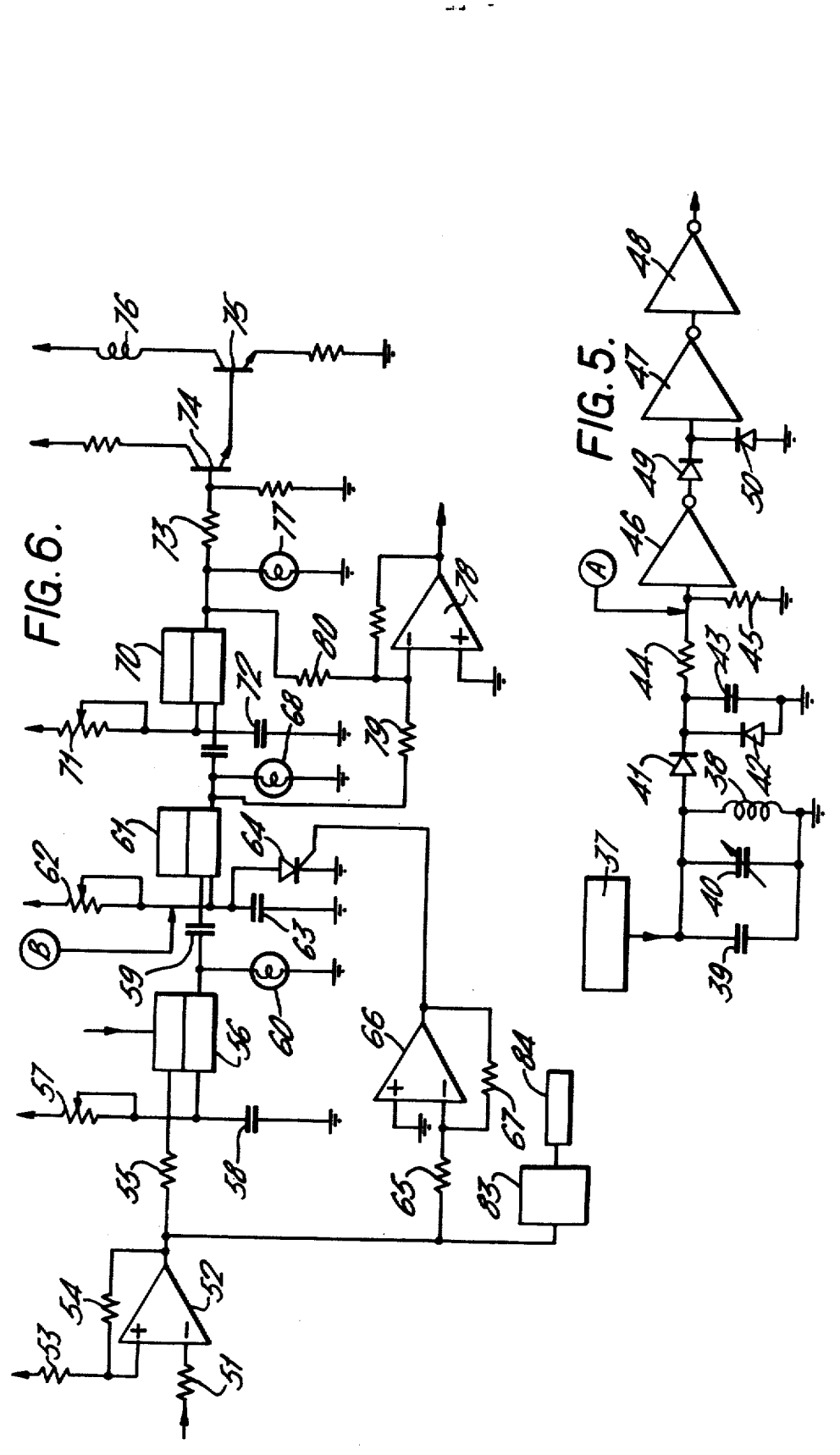

While many suitable circuit arrangements are possible, by which the pulsed variations in the capacitance of the capacitor formed by the electrodes 22, 23, or 34, 35 may be converted into a suitable corresponding pulse signal, one arrangement which has proved suitable is shown in FIG. 5. The circuit shown in FIG. 5 comprises a crystal oscillator 37 tuned, in this embodiment, to 2MHz, the output signal of whic is applied to a tuned circuit consisting of an inductance 38, the capacitance probe represented by the capacitor 39, and a trimming capacitor 40. The capacitor 40 is adjusted to give the tuned circuit 38, 39, 40 a resonant frequency close to 2MHz with the venturi throat 20 or 20' filled with milk, and the components 39, 40 are chosen so that the capacitance variation of the probe 39 in the absence of milk in the venturi throat places 2MHz well down the resonance curve of the tuned circuit.

It will therefore be appreciated that a pulse signal corresponding to the milk flow, will appear across the tuned circuit 38 – 40. This signal is filtered by the diodes 41, 42 and the capacitor 43, and attenuated by the resistors 44, 45. The pulse signal is then passed, via buffes and inverters 46, 47, 48 and further diodes 49, 50, to be processed for the derivation of control signals and information, in the circuitry shown in FIG. 6.

Turning then to FIG. 6, it will be seen that the incoming signal is applied through resistor 51 to an operational amplifier 52 which functions in well known manner to square off the milk pulse. The amplifier 52 is connected with the d.c. supply via a resistor 53, and is provided conventionally with an external resistor 54. The output of the amplifier is applied, through resistor 55, a triggering input of a monostable flip flop 56.

This flip flop is provided with a timing circuit consisting of a resistor 57 and capacitor 58, the time constant of which is set to approximately 80 seconds. The purpose of this time delay is to prevent the operation of the subsequent timing circuitry until the proper milking cycle has commenced, since a considerable time delay elapses between the actuation of the teat cups on the cow, and the commencement of a regular pulsating flow of milk from the cow, and during this initial period, the timing of the milk pulses is quite irregular.

The precise delay chosen may differ considerably from the 80 secs mentioned above but is preferably in the region of 0–100 sec.

The flip flop 56 is therefore initially triggered to its ON condition by the first milk pulse which it receives, and the timing cycle set by the timing circuit 57, 58 prevents it from returning to its stable OFF condition until 80 seconds has elapsed. A lamp 60 may be provided to indicate while f.f. 56 is ON. When the flip flop 56 does turn off, its connection through the capacitor 59 to a second monostable flip flop 61 such as to trigger the flip flop 61 to its unstable ON condition.

The flip flop 61 is provided with a timing circuit consisting of the resistor 62 and the capacitor 63, and the flip flop 61 cannot revert to its OFF condition unless the capacitor 63 is charged. The capacitor 63 is shunted by a controlled rectifier 64, which is triggered into condition by milk signal pulses received from inverting operational amplifier 66, which has its input connected through the resistor 65 to the output of the operational amplifier 52. The external circuit of the operational amplifier is completed by the earth connection of its second input, and its conventional feedback resistor 67.

It will be apparent, therefore, that the flip flop 61 cannot return to its stable OFF condition while milk pulses are received and applied to the rectifier 64 at a rate which is sufficient to keep the voltage on the timing capacitor 63 sufficiently discharged. The time constant of the timing circuit 62, 63 is set to correspond to the time interval between milk pulses which, in the particular milking equipment in which the apparatus is to be used, corresponds to the critical milk flow rate at which it is desired to cease drawing milk from the cow. In the application of the invention to conventional milking machinery operating ate 17" vacuum, a period of 4.3 seconds has been found to correspond to milk flow rate of ½lb/min.

In the embodiment illustrated, therefore, the time constant of the timing circuit 62, 63 is set to 4.3 seconds, and when for the first time after the initiation of this timing cycle with the turning ON of the flip flop 61, a delay of 4.3 seconds occurs between the leading edges of successive milk pulses, the flip flop 61 turns OFF. A lamp 68 may be provided to indicate while the flip flop 61 is in its ON condition during this timing cycle.

When the flip flop 61 turns off, it supplies a triggering pulse via the capacitor 69 to a further monostable flip flop 70. The flip flop 70 is held ON for a suitable time (about 2 seconds) by the timing circuit 71, 72 during which time the transistors 74 and 75 are turned on to actuate the solenoid valve 15 of which only the winding 76 is shown in FIG. 6. The milking operation is then completed by the valve 15 turning off the vacuum to the teats and raising the teat cups in readiness for the next milking. A lamp 77 indicates the ON condition of the flip flop 70.

It will be noted that the outputs of both flip flops 61 and 70 are applied to an operational amplifier 78 by the resistors 79 and 80 respectively. This amplified 78 functions to prevent the triggering of the first flip flop 56 while either flip flop 61 or 70 are in the ON condition.

FIG. 7 shows the waveforms at the points A and B on FIGS. 5 and 6 respectively. The waveform A is of course the milk pulse signal, while the waveform B is the waveform of the voltage on the milking period timing capacitor 63.

FIG. 7(a) shows the beginning of the timing period at 81, which marks the end of the 80 second initial rest period.

FIG. 7(b) shows the last few milk pulses of the sequence, with milking stopped at 82 after the charging of the capacitor has continued for 4.3 seconds.

Referring again to FIG. 6, the output of the operational amplifier 52 shown as connected to an integrated device 83 which is in turn connected with a readout device, which may take the form of a digital indicator combined with a print-out device. The purpose of the elements 83 and 84 is to provide an indication of the total milk obtained from the cow which has just been milked. It will be appreciated that by integrating the milk pulses, which due to the accuracy of the probe devices correspond closely in shape and width to the actual pulses of milk passing the probes, a measure of total volume will be obtained. The convenience with which this total milk indication facility may be provided in the apparatus described constitutes one of its important advantages over prior art techniques. It will be apparent also to those skilled in the relevant arts that further modifications and additions are possible to give greater information about and control over, the farmer's herd.

If desired, a probe may be provided in each teat cup claw tube. The signal from each probe may be fed into a control apparatus so that the rate of flow of milk through each of the teat cups may be ascertained.

It will be appreciated that instead of feeding the signals from each probe into a separate control apparatus, the signals may be otherwise manipulated to give the required information.

It will also be apparent that many variations of the apparatus described, may be made within the scope of the present invention. For example, while the conductivity of milk enables the use of conductively operated probes, but in this case corrosion is an undesirble consequence. While in the illustrated embodiment, copper is mentioned as the electrode material, it will be appreciated that other conducting materials may be used.

I claim:

1. Milking machinery control apparatus comprising means positioned at a monitoring point in a milk conduit for monitoring discrete pulses of milk flowing from a cow, means producing a signal having electrical pulses corresponding to said pulses of milk flow, and means operating to discontinue milking upon the elapse of a predetermined time interval between successive electrical pulses of said signal.

2. Apparatus as defined in claim 1 comprising a capacitance probe positioned adjacent said milk flow, and an electrical oscillator and a tuned circuit connected with said probe to produce in said tuned circuit a signal corresponding to said pulses of milk flow.

3. Apparatus as defined in claim 1 in which said signal is applied to integrating means, said integrating means being connected with calibrated indicating means to provide an indication of the total quantity of milk delivered by the cow.

4. Apparatus as defined in claim 1 comprising a capacitance probe which has a pair of electrodes mounted adjacent to the flow of milk, said monitoring point connecting a teat cup to the claw.

5. Apparatus as defined in claim 1 wherein said conduit comprises a venturi at said monitoring point, a probe provided with a pair of electrodes being mounted within the throat of said venturi.

6. Apparatus as defined in claim 1 having a capacitance probe located at said monitoring point, said capacitance probe including a pair of axially separated co-axial metal rings embedded within the wall and said conduit closely adjacent the surface thereof.

7. Apparatus as defined in claim 1 having a capacitance probe located at said monitoring point and comprising a pair of electrodes mounted adjacent to the flow of milk, one of said electrodes being mounted within said milk conduit and spaced from the walls thereof.

8. Apparatus as defined in claim 7 in which the other said electrode comprises a metal ring embedded within the wall of said conduit and closely adjacent thereto, said ring substantially enclosing said first electrode.

9. Apparatus as defined in claim 1 comprising a first timing circuit establishing said predetermined time interval.

10. Apparatus as defined in claim 9 comprising a second timing circuit establishing an initial time interval commencing with the start of the milking of a cow, and means preventing the operation during said initial time interval of said means to discontinue milking.

11. Apparatus as defined in claim 10 wherein said means preventing operation of the means to discontinue milking comprises means which re-starts said first timing circuit in response to each pulse of said signal.

12. Apparatus as defined in claim 1 having a capacitance probe provided with a pair of electrodes mounted at said monitoring point adjacent to the flow of milk, said probe being located in a drop line connecting the teat cups to a milk line of said milking machinery.

13. Apparatus as defined in claim 12 wherein said probe is closely adjacent the uppermost part of said drop line adjacent said milk line.

14. Apparatus as defined in claim 13 in which said drop line is terminated in a sight glass connected with said milk line, said probe being located immediately adjacent said sight glass.

15. Apparatus as defined in claim 13 wherein said drop line terminates in a sight glass connected with said milk line, said conduit and said electrodes being located within the base of said sight glass.

* * * * *